Sept. 18, 1956  J. MORPHIS ET AL  2,763,230
CONVERSION DIAL ATTACHMENT FOR LIQUID
LEVEL GAUGE OR THE LIKE
Filed Nov. 30, 1954
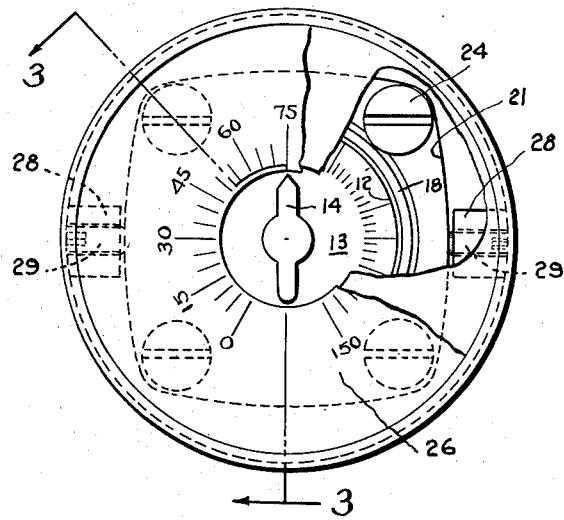
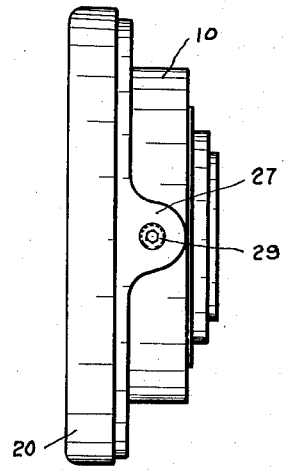
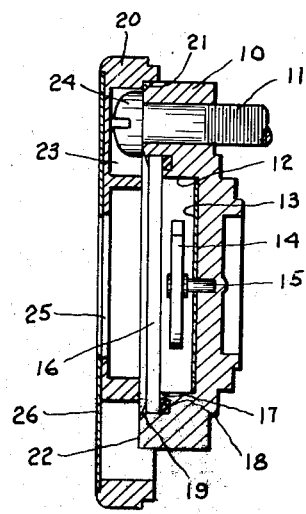
INVENTORS.
JEHU MORPHIS
PAUL B. JOHNSON
BY
Raymond A. Paquin
ATTORNEY.

United States Patent Office  2,763,230
Patented Sept. 18, 1956

2,763,230

CONVERSION DIAL ATTACHMENT FOR LIQUID LEVEL GAUGE OR THE LIKE

Jehu Morphis and Paul B. Johnson, Garland, Tex., assignors to Leta S. Taylor, Garland, Tex.

Application November 30, 1954, Serial No. 472,148

4 Claims. (Cl. 116—129)

This invention relates to liquid level gauges, or the like, and has particular reference to a new and improved conversion dial attachment adapted to be positioned over the gauge head whereby the gauge dial may be converted to desired type of dial without disturbing the gauge or gauge head.

An object of the invention is to provide a new and improved dial attachment for liquid level gauges, or the like.

Another object is to provide a conversion dial attachment of the type set forth which may be installed on the gauge head already in position without disturbing the gauge head in any manner and which attachment is relatively simple and inexpensive in construction and assembly on the gauge head.

Another object is to provide a conversion dial attachment of the type set forth which eliminates the necessity of a separate indicator but employs the indicator already on the gauge head.

Another object is to provide a new and improved device of the type set forth which may be attached to or removed from the gauge head with a minimum of time and effort.

Other objects and advantages of the invention will be apparent from the following description taken in connection with the accompanying drawings. It will be understood that changes may be made in the details of construction and arrangement of parts shown and described without departing from the spirit of the invention, as the preferred form has been given by way of illustration only.

Referring to the drawings:

Fig. 1 is a top or plan view of a device embodying the invention;

Fig. 2 is a side view thereof; and

Fig. 3 is a sectional view taken on line 3—3 of Fig. 1, looking in the direction of the arrows.

Referring more particularly to the drawings wherein similar reference characters designate corresponding parts throughout, the gauge head 10 is, preferably, of the type used in connection with liquid level gauges for use on storage tanks for butane, propane or other liquified petroleum gases although, the invention may also be applied to other types of gauges as well.

The gauge head 10 is adapted to be secured on the tank by the bolts or other suitable means 11 and is provided with the recess 12 in which is positioned the dial 13 and the indicator 14 which may be of the magnetic type, which is pivotally mounted on the shaft 15 in cooperative position relative to dial 13.

By employing the magnetic type indicator 14, the head may be completely sealed from the tank and the indicator 14, actuated by a magnet connected to the float, as shown for example in Patent Number 2,578,104, issued December 11, 1951.

The recess 12 is adapted to be closed by the sight glass or crystal 16 which is positioned on the flange 17 and resilient gasket 18 and retained in position thereon by the turned rim 19.

The conversion dial attachment comprises the housing portion 20 having a recess surrounded by the peripheral shoulder 21 adapted to receive the upper edge portion 22 of gauge head 10 and the recess will be formed of the size and shape adapted to receive the upper edge of said gauge head or of such size and shape as to receive practically any gauge depending upon the gauge heads on which the conversion dial attachment is to be employed.

The housing member 20 has the recesses 23 adapted to receive the heads 24 of the fastening bolts 11.

The housing 20 is also provided with the central aperture 25 aligned with dial 13 and indicator 14.

This sight opening 25 may also be closed by a sight glass or crystal, if desired.

Between the periphery of sight opening 25 and the periphery of housing 20 is secured the conversion dial 26 which will cooperatively function with indicator 14 to indicate the liquid level in the storage tank.

The housing 20 is provided with a suitable number of integral extension portions 27 of which a pair of diametrically opposed points are shown and these extensions 27 may be formed with the internal bosses 28 through which are threaded the retaining screws 29 which, when tightened, retain the conversion dial attachment in operative position on the gauge head 10.

It will be seen that if a tank, as shipped, is equipped with a guage having one form of dial, such as a percentage dial, and it is desired to convert the gauge to some other type dial, that by use of the conversion dial attachment of this invention, it is not necessary to remove the installed gauge and the expense and trouble of such removal and replacement is eliminated by fitting over the gauge head the conversion dial attachment of the present invention without loosening a single screw or otherwise disturbing the gauge originally installed.

From the foregoing it will be seen that I have provided simple, efficient and economical means for obtaining all of the objects and advantages of the invention.

We claim:

1. In a device of the character described for use with a gauge head having a dial, an indicator pivotally mounted relative to said dial and a transparent crystal over said dial and indicator and in sealed relation with said head, a conversion dial attachment having a flange adapted to extend over the adjacent edge of said gauge head and said attachment having a central sighting portion aligned with said indicator whereby the position of said indicator may be observed and said attachment having a portion surrounding said sighting portion, said surrounding portion bearing indicia for indication by said indicator.

2. In a device of the character described for use with a gauge head having a dial, an indicator pivotally mounted relative to said dial and a transparent crystal over said dial and indicator and in sealed relation with said head, a conversion dial attachment having a flange adapted to extend over the adjacent edge of said gauge head and said attachment having a central sighting portion aligned with said indicator whereby the position of said indicator may be observed and said attachment having a portion surrounding said sighting portion, said surrounding portion bearing indicia for indication by said indicator and means for securing said attachment on said gauge head.

3. In a device of the character described for use with a gauge head having a dial, an indicator pivotally mounted relative to said dial and a transparent crystal over said dial and indicator and in sealed relation with said head, a conversion dial attachment having a flange adapted to extend over the adjacent edge of said gauge head and said attachment having a central sighting portion aligned with said indicator whereby the position of said indicator may be observed and said attachment having an opaque portion surrounding said sighting portion, said surrounding portion bearing indicia for indication by said indicator.

4. In a device of the character described for use with a gauge head having a dial, an indicator pivotally mounted relative to said dial and a transparent crystal over said dial and indicator and in sealed relation with said head, a conversion dial attachment having a flange adapted to extend over the adjacent edge of said gauge head and said attachment having a central sighting portion aligned with said indicator whereby the position of said indicator may be observed and said attachment having an opaque portion surrounding said sighting portion, said surrounding portion bearing indicia for indication by said indicator and means for securing said attachment on said gauge head.

References Cited in the file of this patent

UNITED STATES PATENTS

| | | |
|---|---|---|
| 960,946 | Jones | June 7, 1910 |
| 2,612,132 | Triplett | Sept. 30, 1952 |